United States Patent
Stampfli

[15] 3,671,009
[45] June 20, 1972

[54] FLUID-CONTROLLING VALVE

[72] Inventor: Harald Stampfli, Petit-Saconnex, Switzerland

[73] Assignee: Lucifer S.A., Carouge-Geneva, Switzerland

[22] Filed: March 20, 1970

[21] Appl. No.: 21,336

[30] Foreign Application Priority Data

April 15, 1969 Switzerland ............................. 163/70
Jan. 8, 1970 Switzerland ............................. 164/70

[52] U.S. Cl. .................................. 251/129, 251/86, 251/77
[51] Int. Cl. ........................................................ F16k 31/06
[58] Field of Search ........ 251/129, 77, 84, 85, 86, 87, 251/88

[56] References Cited

UNITED STATES PATENTS

| | | | |
|---|---|---|---|
| 2,321,095 | 6/1943 | Mantz | 251/77 X |
| 2,114,961 | 4/1938 | Gille | 251/77 X |
| 3,117,762 | 1/1964 | Bartlett | 251/88 |
| 2,596,409 | 5/1952 | Johnson et al. | 251/77 |

Primary Examiner—Arnold Rosenthal
Attorney—Emory L. Groff and Emory L. Groff, Jr.

[57] ABSTRACT

An electromagnetically controlled valve, wherein the closure-member is connected with the movable core of the controlling electromagnet in a simple and smooth manner by means of a coupling the members of which are rigid respectively with the core and with the closure-member, one of said members housing with a clearance the other member and defining with the latter a space inside which an O-ring is held with an axial clearance. Said O-ring fitted in an annular groove extending outwardly of the housing transmits the motion of the core to the closure-member so as to raise it off its seat.

1 Claim, 3 Drawing Figures

INVENTOR
HARALD STAMPFLI
BY Emory L. Groff
ATTORNEY

FLUID-CONTROLLING VALVE

The present invention has for its object an electromagnetically controlled fluid-controlling valve of the type including a movable closure-member connected with a movable part of the controlling electromagnetic means, wherein the connection between the closure-member and said movable part is obtained in a very simple manner. Furthermore, said connection provides a damped drive together with a great resistance to wear.

According to the invention, the closure-member as well as the movable part carry respectively the two members of a coupling one of said members being provided with a housing in which the cooperating member is introduced with a clearance, said members defining between them an annular chamber enclosing an O-ring, the outer diameter of which is larger than the input diameter of the housing while its inner diameter is smaller than the diameter of a bulging portion of the member fitted in said housing.

Figure 1:
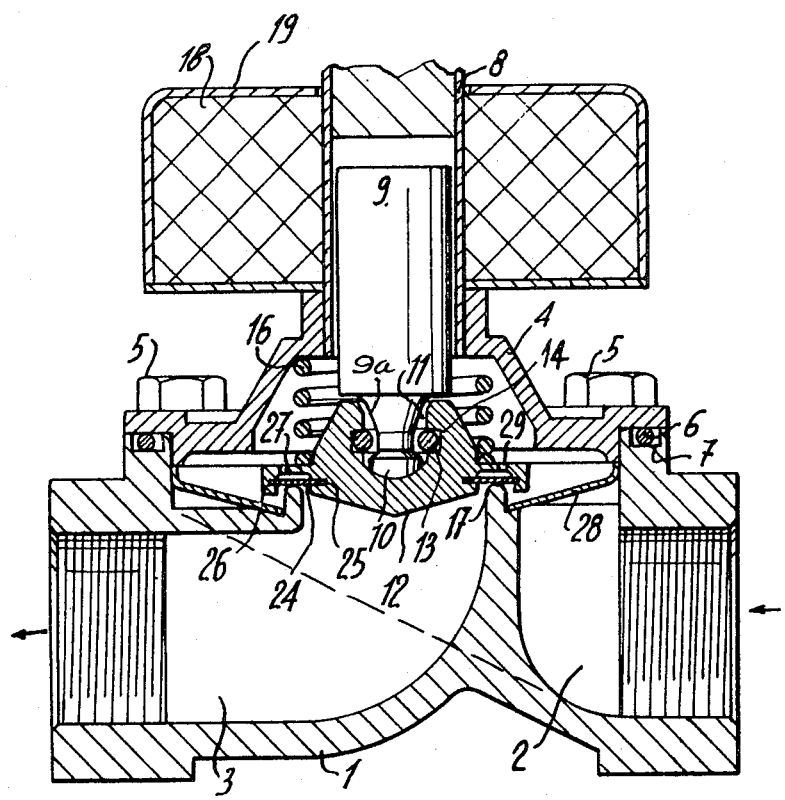
Figure 2:
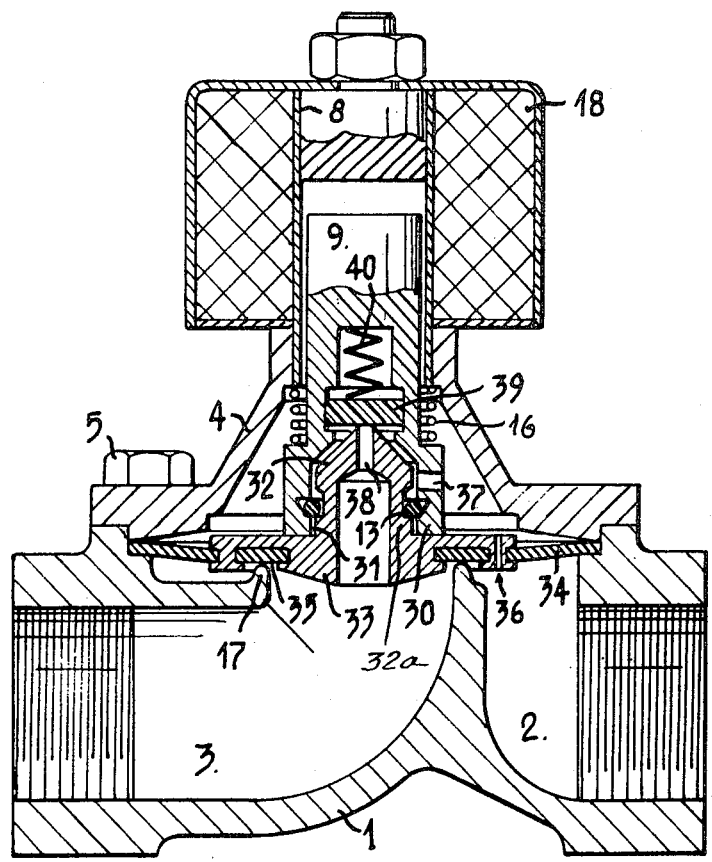
Figure 3:
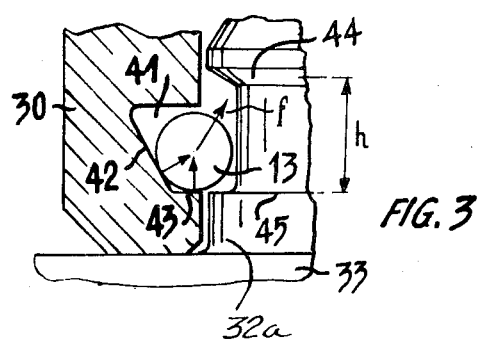

The accompanying drawings illustrate diagrammatically and by way of examples two embodiments of such an improved valve. In said drawings:

FIG. 1 is a sectional view of a first embodiment;
FIG. 2 is a sectional view of the second embodiment;
FIG. 3 illustrates on a larger scale a detail of FIG. 2.

The fluid-handling valve illustrated in FIG. 1 includes a body 1 in which a fluid input chamber 2 and a fluid output chamber 3 are formed, both chambers being provided with tappings through which they may be connected respectively with a fluid-feeding channel and with a fluid output channel.

The upper section of said valve carries a cover 4 secured to the body 1 by means of bolts 5, fluidtightness being ensured by an O-ring packing 6 inserted in an annular groove 7 formed in the upper edge of the valve body.

The cover 4 carries a tubular cylinder 8 made of non-ferromagnetic material, in which may slide a movable ferromagnetic cylindrical core 9. The lower end of said core includes an extension 9a terminating in a head 10 engaging a housing 11 formed in the closure-member 12 and held with a clearance in said housing by an O-ring 13 fitted in an annular groove 14 formed in the closure-member.

It is apparent that the outer diameter of said O-ring 13 is larger than the diameter of the input opening of said housing 11, whereas the inner diameter of said O-ring is smaller than the diameter of the head 10 constituted by a bulge on the terminal section of the core 9.

The actual closure-member 12 is subjected to the action of a spring 16 urging it away from the cover 4 and onto the seat 17 provided for the closure-member. Said spring is inserted in a frustoconical chamber formed on the underside of the cover 4. It surrounds the lower end of the movable core 9 and also the body of the closure-member 12 which forms a bearing for said spring.

The tubular cylinder 8 is surrounded by an electromagnetic winding 18 of a cylindrical shape enclosed in a cap 19.

The closure-member 12 is provided with an annular packing 24 constituted by a washer made of elastomer. The inner and outer edges of said washer are fitted in corresponding grooves 25 and 26 formed in the lateral surfaces of a broad annular recess 27 cut within the bottom of the closure-member 12. The medial section of the annular packing 24 registers with the seat 17 onto which it is urged when the valve is closed.

A connecting port 29 formed in the annular flange of the closure-member 12 opens into said recess 27 so as to afford a passage for the fluid out of the input chamber 2 towards the recess 27 to the rear of the packing 24, whereby a balance is obtained between the pressures exerted on the two sides of said packing 24 when the valve is in its open condition. A filter 28 located round the seat 17 in the input chamber prevents any impurities from clogging said connecting port 29.

As illustrated, when the closure-member 12 is on its seat, the head 10 of the electromagnetic core rests on the bottom of the housing 11 and is spaced with reference to the O-ring 13. When the core 9 is shifted upwardly by the magnetic attraction produced by the current flowing through the winding 18, the first fraction of the travel of said core is executed freely without the closure-member 12 being carried along. Consequently, the core 9 assumes a predetermined speed and at the moment at which the head 10 engages the O-ring 13, kinetic energy already stored in the core during the first fraction of its travel cooperates in ensuring a speedy release of the closure-member, whereby the valve is opened. By reason of the elasticity of the O-ring, the closure-member 12 is carried along without any harsh shock, which reduces considerably the straining of the different parts.

The second embodiment illustrated in FIG. 2 comprises also a body 1 with input and output chambers 2 and 3, and a cover 4 secured to the body by bolts 5. The cover 4 carries again a tubular cylinder 8 made of non-ferromagnetic material and inside which may slide a cylindrical ferromagnetic core 9. Said core may be shifted against the action of a return spring 16 by the magnetic field produced by the energization of the winding 18. The core 9 includes at its lower end a tubular extension 30 forming a housing 31 adapted to be engaged by the head 32 of an extension 32a of the actual closure-member 33, the periphery of which is connected by an annular diaphragm 34 with the body 1 of the valve. The outer edge of said diaphragm 34 is clamped between the body 1 and the cover 4 and ensures thus fluidtightness between said two parts. The closure-member is also provided with an annular fluidtight packing 35 adapted to engage the seat 17 of the valve body 1.

The valve illustrated is of the well-known type controlled by an electromagnetically assisted auxiliary mechanism. As soon as such a valve handles a fluid subjected to a sufficient pressure, the movements of the flap are defined chiefly by the differences in pressure between the two sides of the diaphragm 34 and/or of the actual closure-member. To this end, the space extending between the diaphragm 34 and the cover 4 communicates with the input chamber 2 through a gauged passage 36. The fluid lying above the diaphragm 34 may be exhausted as provided by a radial bore 37 passing through the tubular extension 30 and by an axial bore 38 in the closure-member 33 whenever the upper opening of the axial bore 38 is uncovered by the packing 39 carried by the core 9 and subjected to the pressure of a spring 40.

When the pressure of the fluid to be controlled is too low for it to control the movements of the closure-member 33, said movements are obtained through a direct action of the core 9 on the closure-member. To this end, the core 9 and closure-member 33 are coupled by means of an O-ring 13 as illustrated with further detail in FIG. 3. Said O-ring 13 is housed partly in a groove 41 formed in the extension 30. The outline of said groove is designed in a manner such that, for raising the closure-member 33, the driving force is transmitted from the core 9 to the closure-member solely by the compressed O-ring without any shearing of said ring. For this reason, as shown cross-sectionally, the groove 41 includes an oblique side wall 42 and a flat horizontal lower wall 43, said walls acting together on the cooperating portion of the O-ring 13 in a manner such that the combined pressures exerted by said walls of the groove produce a resultant $f$ extending substantially in a direction perpendicular to the wall 44 on the closure-member 33. Furthermore, said wall 44 of a generally frustoconical shape acting as a bearing surface has a slope such that is exerts on each portion of the O-ring a reaction, the direction of which is exactly opposed to the resultant $f$ produced by the associated walls 42 and 43.

It should be noted that the height $h$ separating the bearing wall 44 from the collar 45 provided on the head 32 of the closure-member 33 is sufficient for it to be possible for the core 9 to execute an axial movement with reference to the closure-member 33.

The axial clearance thus obtained for the O-ring is essential since it allows a shifting of the packing 39 in order to uncover the bore 38 in the closure-member when the core 9 has been attracted by the magnetic field produced by the winding 18.

The cross-section of the groove 41 is at least equal to the cross-section of the O-ring, and consequently, when the closure-member is introduced into the housing 31 of the core 9, the O-ring is urged back into said groove.

In contradistinction, the closure-member 33 cannot be separated from the tubular extension 30 of the core otherwise than by destroying the O-ring 13 by an energetic tractional stress adapted to separate the two parts considered.

I claim:

1. In a fluid-controlling valve comprising a body provided with an input chamber and an output chamber, a closure-member adapted to be shifted axially between a position closing the output chamber with reference to the input chamber and a position allowing said chambers to communicate with each other, an electromagnet including a movable part controlled thereby, coaxial extensions on said movable part and on said closure-member, said coaxial extensions facing each other and forming parts of a coupling, one of which is provided with a housing of generally cylindrical shape and open at one end into which the other one provided with an enlarged head at its free end fits with a clearance, said housing having an annular groove therein, an O-Ring fitted in said groove, the outer diameter of said O-Ring being larger than the diameter of the opening of the housing, the inner diameter of said O-Ring being smaller than the diameter of said enlarged head, the annular space between said coaxial extensions in the area of said groove being larger than the volume of said O-Ring, thus providing an axial clearance between the parts of said coupling, the cross-section of the annular groove being at least as large as that of the O-Ring and the shape of said groove being such that when one part of the coupling is about to be carried along by the other one, the resultant of the forces exerted by the walls of said groove on the O-Ring is directed obliquely with reference to the axis of the O-Ring while the other part of said coupling is provided with a bearing surface for said O-Ring, the general shape of which is oblique so as to exert on the O-Ring a force opposing that resultant force.

* * * * *